United States Patent
Eichstaedt et al.

(10) Patent No.: US 6,218,958 B1
(45) Date of Patent: Apr. 17, 2001

(54) INTEGRATED TOUCH-SKIN NOTIFICATION SYSTEM FOR WEARABLE COMPUTING DEVICES

(75) Inventors: Matthias Eichstaedt; Qi Lu, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/168,630

(22) Filed: Oct. 8, 1998

(51) Int. Cl.$^7$ ........................................... G08B 5/22
(52) U.S. Cl. ..................... 340/825.46; 340/825.19; 340/407.1; 455/41; 455/66; 455/517
(58) Field of Search .................. 340/825.46, 407.1, 340/825.19, 965; 434/113; 455/41, 66, 517; 370/349, 338, 346

(56) References Cited

U.S. PATENT DOCUMENTS

| | | | |
|---|---|---|---|
| 3,108,268 | 10/1963 | Uttal | 340/407 |
| 4,277,980 | 7/1981 | Coats et al. | 73/646 |
| 4,297,677 | 10/1981 | Lewis et al. | 340/148 |
| 4,300,129 | 11/1981 | Cataldo | 340/539 |
| 4,581,491 | 4/1986 | Boothroyd | 179/107 FD |
| 4,728,934 | 3/1988 | Pfander et al. | 340/407 |
| 4,803,487 * | 2/1989 | Willard et al. | 340/825.44 |
| 4,975,693 * | 12/1990 | Davis et al. | 340/825.44 |
| 5,007,105 | 4/1991 | Kudoh et al. | 455/344 |
| 5,327,120 | 7/1994 | McKee et al. | 340/825.46 |
| 5,388,992 | 2/1995 | Franklin et al. | 434/114 |
| 5,394,140 * | 2/1995 | Wong et al. | 340/825.4 |
| 5,488,351 | 1/1996 | Hedayatnia et al. | 340/407.1 |
| 5,565,840 | 10/1996 | Thorner et al. | 340/407.1 |
| 5,595,488 | 1/1997 | Gozlan et al. | 434/236 |
| 5,663,703 | 9/1997 | Pearlman et al. | 340/407.1 |
| 5,686,882 | 11/1997 | Giani | 340/407.1 |
| 5,719,561 * | 2/1998 | Gonzales | 340/825.46 |
| 5,764,594 | 6/1998 | Berman et al. | 368/12 |
| 5,960,367 * | 9/1999 | Kita | 455/567 |

FOREIGN PATENT DOCUMENTS

| | | |
|---|---|---|
| 298 00 208 U | 4/1998 | (DE) . |
| 4-053319 | 2/1992 | (JP) . |
| 7-213008 | 8/1995 | (JP) . |

\* cited by examiner

*Primary Examiner*—Michael Horabik
*Assistant Examiner*—Yves Dalencourt
(74) *Attorney, Agent, or Firm*—John L. Rogitz

(57) ABSTRACT

A tactile notification device that can be embodied in, e.g., a wristwatch, communicates via wireless link with plural personal computing devices, including cellular telephones, pagers, and palm top computers, of the person wearing the notification device. When one of the personal computing devices alerts, e.g., when the telephone receives an incoming call, the pager receives a page, or the palm top computer receives an email, the personal computing device sends a signal to the notification device, which generates a discrete tactile signal against the person's skin. The notification device can generate different tactile signals, and each tactile signal can be correlated as desired by the user to one of the personal computing devices. In one embodiment, opposed pinch bars are provided on the skin-facing tactile surface of a wristwatch to gently pinch the skin and thereby establish a first tactile signal that can be correlated to, for example, an alert for an incoming phone call. Also, a rotating bar can be provided on the tactile surface of the wristwatch, and the tactile signal that corresponds to, e.g., an incoming page can be established by rotating the bar against the skin.

21 Claims, 3 Drawing Sheets

INTEGRATED TOUCH-SKIN NOTIFICATION SYSTEM FOR WEARABLE COMPUTING DEVICES

BACKGROUND OF THE INVENTION

1. Field of the Invention

The present invention relates generally to portable computing devices, and more particularly to systems and methods for alerting a user when one of a plurality of wearable computing devices have generated a user alert.

2. Description of the Related Art

Personal computing devices that can be carried by a person have become popular, and such devices continue to proliferate as the size of computing devices shrinks, allowing the devices to become comparatively unobtrusive and lightweight to carry. Examples of personal computing devices are information devices such as pagers, cellular telephones, laptop and palm top computers, personal music systems, camcorders, and dictating machines, and sensor devices, including biosensors such as heart rate sensors and blood pressure sensors.

As recognized by the present invention, as computing devices continue to be miniaturized, people can be expected to carry more and more wearable personal computing devices. Furthermore, the effectiveness of such devices, as well as their ease of use, would be promoted if some or all of a person's personal computing devices were integrated in a single system or otherwise configured to work in concert with each other. With this in mind, a wireless radiofrequency (RF) communication protocol, referred to as "Bluetooth", has been proposed by an industry consortium to enable computing devices to communicate with each other using what is essentially a wireless standardized local area network.

The present invention recognizes, however, that even should personal computing devices be configured to communicate with each other, such devices nonetheless generate unique alerts that are not integrated with each other. For example, a cellular telephone rings to indicate an incoming call, a pager beeps or vibrates to indicate a page, a biosensor might alarm when a setpoint is reached, a palm top computer might display a visual alert of an incoming email, and so on. In other words, each personal computing device generates its own alert, whether audible, visual, or vibratory.

As understood herein, the generation of many unique alerts has drawbacks. One drawback is that a person must constantly "tune in" to multiple sensory alerts, i.e., the person must listen for a pager beep or cellular telephone ring, visually observe a palm top computer screen, and remain sensitive for a tactile signal. This undesirably diverts the person's attention away from other activities.

Additionally, it is frequently the case that existing alerts are either ineffective or inappropriate, depending on the circumstances. For example, a vibratory tactile alert is ineffective when a person subjected to the alert is operating a vibrating piece of machinery. Also, an audible alert might be ineffective for a person who is hard of hearing, or who is in a noisy place. Moreover, auditory and visual alerts are often inappropriate when, for example, a person is in church, or a meeting, or other circumstance that renders audible and/or visual alerts unwelcome distractions.

Accordingly, the present invention understands that with so many devices requiring a person's attention at various times and under various circumstances, a need exists for an integrated alert notification system. The present invention recognizes that the above-noted shortcomings can be addressed as set forth herein.

SUMMARY OF THE INVENTION

A system is disclosed for centralizing notification of alerts of plural personal computing devices. The system includes a tactile notification device that can be worn by a person and that defines a tactile surface facing the person such that the tactile notification device generates one or more person-detectable tactile signals when activated. Plural personal computing devices that are bearable by the person communicate with the tactile notification device via a wireless communication network.

In a preferred embodiment, the tactile notification device includes a wireless communication receiver, and the personal computing devices transmit respective alert signals to the receiver to activate the tactile notification device. Moreover, the tactile notification device generates plural tactile signals, and each tactile signal is different from other tactile signals generated by the tactile notification device. As disclosed in detail below, each tactile signal is correlated to a respective alert signal from a respective one of the personal computing devices. Preferably, a user can correlate the tactile signals to the respective alert signals, and in this preferred embodiment the tactile notification device includes a data store to receive user signals indicating a user-defined correlation of the tactile signals to the respective alert signals.

Per the present invention, the tactile notification device includes one or more tactile elements engaged with the tactile surface. The tactile elements can include parallel bars spaced from each other, with at least one bar being disposed on the tactile surface and reciprocatingly movable toward and away from the other bar to gently pinch the person's skin. Additionally, the tactile elements include at least one bar rotatingly engaged with the tactile surface. A pressure sensor can be provided on the tactile notification device for generating a contact signal when the tactile surface contacts another surface, such as the skin of a person.

In another aspect, a tactile notification device includes a housing, one or more tactile elements on the housing, and a processor in the housing for activating the tactile elements to generate plural tactile signals. At least some tactile signals correspond to respective alerts from respective personal computing devices that are in wireless communication with the tactile notification device.

In still another aspect, a method is disclosed for signalling to a person when one of plural personal computing devices generates an alert signal. The method includes providing a tactile notification device configured to generate plural tactile signals, with at least two tactile signals being different from each other. Also, the method includes establishing wireless communication between the personal computing devices and the tactile notification device. The tactile notification device is caused to generate a tactile signal corresponding to an alerting personal computing device when the alerting personal computing device generates an alert signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
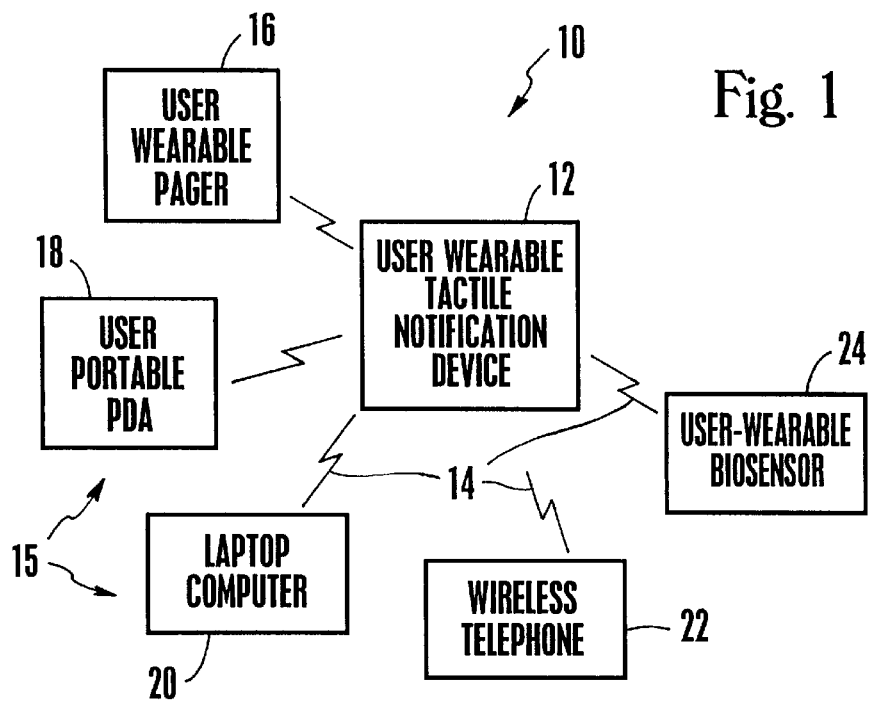
FIG. 1 is a block diagram of the present alert notification system.

Referring initially to FIG. 1, a system is shown, generally designated 10, for generating plural tactile signals indicating respective alerts generated by respective personal computing devices. As shown, the system 10 includes a tactile notification device 12 in wireless communication, via a wireless network 14, with plural personal computing devices, generally designated 15. As intended herein, a personal computing device is a portable computing device that can be borne by a person. As shown in FIG. 1, the personal computing devices 15 can include a pager 16, a personal digital assistant (PDA) 18 such as, e.g., a palm top computer, a laptop computer 20, a wireless or cellular telephone 22, and a biosensor 24. All of the personal computing devices 15 can be worn or otherwise carried by a person.

Per the present invention, the personal computing devices 15 generate respective deviceunique wireless alert signals which are triggered by appropriate events (e.g., an incoming call or page, etc.), and the personal computing devices transmit the alert signals via the network 14. The wireless alert signals can be in addition to or more preferably in lieu of the conventional alert signals generated by the personal computing devices 15. Thus, each personal computing device 15 includes a respective transmitter for communicating via the network 14.

As envisioned by the present invention, the network 14 is a short-range wireless network that links the personal computing devices 15 with the tactile notification device 12. In one embodiment, the network 14 can be an infrared (IR) network using IR computer communication principles known in the art. Or, the network 14 can be an RF network such as the above-mentioned "Bluetooth" network operating at about 2.4 gHz. As yet another alternative, the network 14 can be a personal area network (PAN) such as that disclosed in U.S. Pat. No. 5,796,827 to Coppersmith et al., owned by the present assignee.

Figure 2:
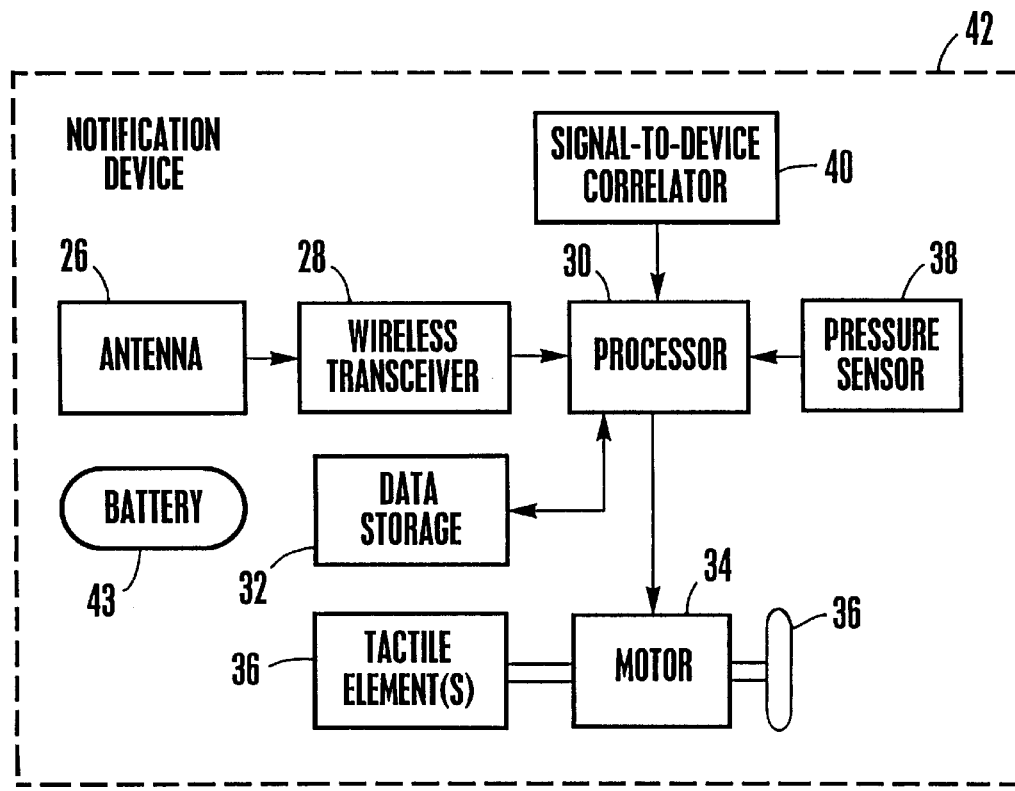
FIG. 2 is a schematic diagram of the tactile notification device of the present invention.

Details of the preferred tactile notification device is shown in FIG. 2. As shown, the tactile notification device 12 includes an antenna 26 electrically connected to a wireless receiver or transceiver 28. The antenna 26 with receiver 28 are configured as appropriate for communicating with the network 14, and more specifically for receiving alert signals that are transmitted by the personal computing devices 15.

Signals detected by the receiver 28 are sent to a processor 30. The processor 30 can be any appropriate processor such as, e.g., a type 386, 486, or Pentium® processor. As shown in FIG. 2, the processor 30 accesses a data store 32 and controls (through appropriate servo control circuitry) a motor 34. The data store of the present invention can hold logic elements that may be executed by the processor 30 as a series of computer-executable instructions in accordance with the flow charts disclosed below. These logical instructions may reside, for example, in RAM or on an application specific integrated circuit (ASIC) chip.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$compatible code.

As shown in FIG. 2, the motor 34 is mechanically coupled to one or more tactile elements 36 to activate the tactile elements 36 and thereby generate tactile signals in accordance with disclosure below. Also, in the preferred embodiment, a pressure sensor 38 can generate a contact signal when the tactile notification device 12 is positioned against a surface, such as the skin of a person. The contact signal is sent to the processor 34 as shown. Furthermore, a signal-to-device correlator 40 is connected to the processor 30 for allowing a user to correlate each unique tactile signal generated by the tactile elements 36 to a respective alert signal from a respective personal computing device 15. Preferably, all of the components shown in FIG. 2 are contained in a lightweight hollow metal or plastic housing 42. A battery 43 is in the housing 42 and is electrically connected to the components therein for energizing the components.

Figure 3:
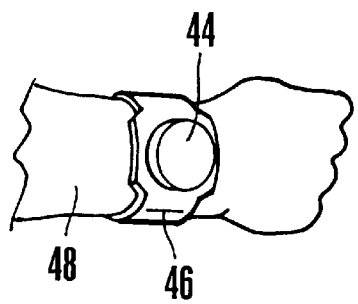
FIG. 3 is a perspective view showing the tactile notification device embodied as a wristwatch.
Figure 4:
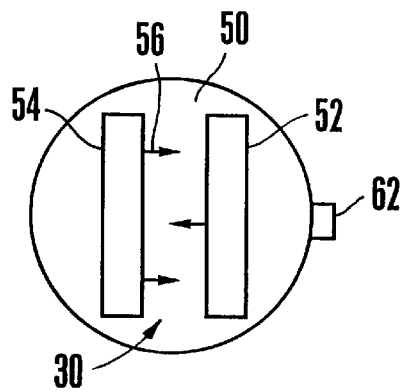
FIG. 4 is a plan view of the tactile surface of the notification device shown in FIG. 3, showing a first tactile element.
Figure 5:
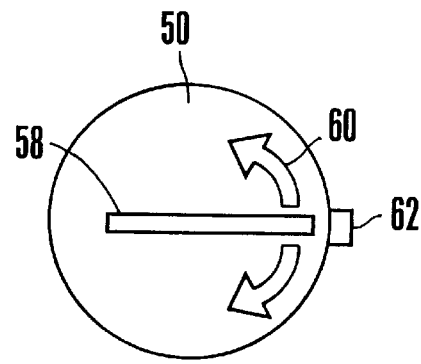
FIG. 5 is a plan view of the tactile surface of the notification device shown in FIG. 3, showing a second tactile element.

The tactile notification device 12 of the present invention preferably is embodied in a device that touches the person's skin, such as, e.g., glasses, rings, shoes, hats, or clothing. As shown in FIGS. 3–5, however, in one preferred embodiment the tactile notification device 12 is embodied in a wristwatch 44, with the housing 42 of the tactile notification device being established by the case of the wristwatch 44. As shown, the wristwatch 44 is held by a band or strap 46 to the wrist of a person 48.

FIG. 4 and 5 show that the tactile notification device of the present invention, when embodied in a wristwatch 44, defines a tactile surface 50 that is positioned against the wrist of the person when the watch 44 is worn as intended. The motor-controlled tactile elements 36 are engaged with the watch 44, and in one preferred embodiment shown in FIG. 4 the tactile elements 36 include first and second parallel bars 52, 54 that are spaced from each other as shown. If desired, the bars 52, 54 can be retracted by the motor 34 (FIG. 2) such that they are flush with the surface 50 when no tactile signal is being generated, with the bars 52, 54 being movable outwardly past the surface 50 when they are to be used to generate a tactile signal.

In addition, at least one bar 52, 54, and preferably both, are movable laterally relative to the surface 50. To generate a tactile signal, the motor 34 causes at least one bar, and preferably both, to reciprocate toward and away from each other, as indicated by the arrows 56 in FIG. 4. This gently pinches the skin of the person, indicating an alert signal has been received from one of the personal computing devices 15.

FIG. 5 shows that a second tactile element 36 can be established by a rotating bar 58 on the tactile surface 50. The arrows 60 indicate that the bar 58 can rotate clockwise or counterclockwise. Like the bars 52, 54 shown in FIG. 4, the bar 58 shown in FIG. 5 can be retracted by the motor 34

(FIG. 2) such that it is flush with the surface 50 when no tactile signal is being generated, with the bar 58 being movable outwardly past the surface 50 when it is to be used to generate a tactile signal. To generate a tactile signal, the motor 34 causes the bar 58 to rotate as indicated by the arrows 60 in FIG. 5, indicating an alert signal has been received from one of the personal computing devices 15.

In addition to the tactile elements 36, the watch 44 can also embody the signal-to-device correlator 40 (FIG. 2). In the example shown, the signal-to-device correlator 40 includes a button 62 reciprocatingly engaged with the watch 44 and associated with a switch for allowing a person to generate an electrical signal that is received by the processor 30.

As intended by the present invention, the tactile notification device 12 generates plural tactile signals, with each tactile signal being unique from the other tactile signals. For example, a first tactile signal can be established by the bars 52, 54 shown in FIG. 4 pinching a person's skin, and a second tactile signal can be established by the counterclockwise rotation, at a slow speed for a short time period, of the bar 58 shown in FIG. 5. Yet a third tactile signal can be established by the clockwise rotation, at a fast speed for a prolonged time period, of the bar 58 shown in FIG. 5. Indeed, a fourth tactile signal can be established by the various tactile elements 36 working together in concert.

Various combinations of tactile element speed, period of motion, and nature of motion can establish respective tactile signals. In addition, the bars 52, 54, 58 can swipe laterally across the skin if desired, or reciprocate into and away from the skin, with varying degrees of strength, to establish various unique tactile signals. Still further, tactile elements other than those shown can be used in accordance with the present invention. For example, spherical, disc-shaped, parallelepiped-shaped, or pointed tactile elements can be used. As recognized herein, the pinching/rotating/contacting of the tactile elements 36 relative to the skin of the person is quiet, unobtrusive, and detectable by the person even when the person is operating a vibrating piece of machinery.

Figure 6:
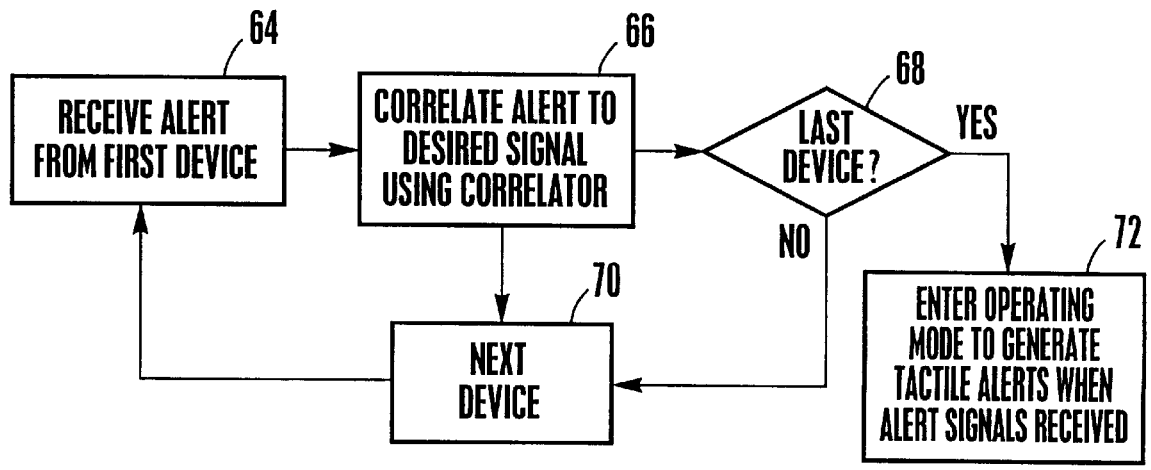
FIG. 6 is a flow chart showing the steps in correlating tactile signals to personal computing devices.

In accordance with present principles, each tactile signal is correlated to a respective alert signal from a respective one of the personal computing devices 15, with the system 10 permitting a user to correlate the tactile signals to the respective alert signals for storage of the user's correlation in the data store 32 (FIG. 2). With this in mind, reference is made to FIG. 6, which indicates, at block 64, that an alert signal from a first personal computing device 15 is received by the tactile notification device 12. This signal is used as a calibrating signal. When it is received, the user manipulates the signal-to-device correlator 40 as appropriate to cause the processor 30 to correlate the alert signal with the a user-selected tactile signal.

To do this, the user might, for example, scroll though the various tactile signals by depressing the signal-to-device correlator 40 twice rapidly in succession to enter a calibrate mode, then depressing the signal-to-device correlator 40 to scroll though the tactile signals. When the tactile signal the user wishes to correlate to the current alert signal (and, hence, to a particular personal computing device 15) is generated by the tactile notification device 12, the user can rotate the signal-to-device correlator 40 or push it rapidly twice in succession, signalling to the processor 30 to store the correlation in the data store 32 for subsequent generation of the tactile signal whenever the particular alert is received. It is to be understood that if desired, the signal-to-device correlator 40 can include plural knobs, dials, and pushbuttons if desired to undertake the above steps.

After correlation, the process moves to decision diamond 68 to determine whether the user wishes to correlate any more personal computing devices 15 with respective tactile signals. If so, the process moves to block 70 to configure the tactile notification device 12 to receive a calibration signal from a new personal computing device 15, and then moves to block 64 to receive the calibrating alert signal from the new personal computing device. When the user indicates that all personal computing devices have been calibrated, the process moves from decision diamond 68 to block 72 to enter the operating mode to generate tactile alerts when alert signals are received, as set forth below in reference to FIG. 7.

Figure 7:
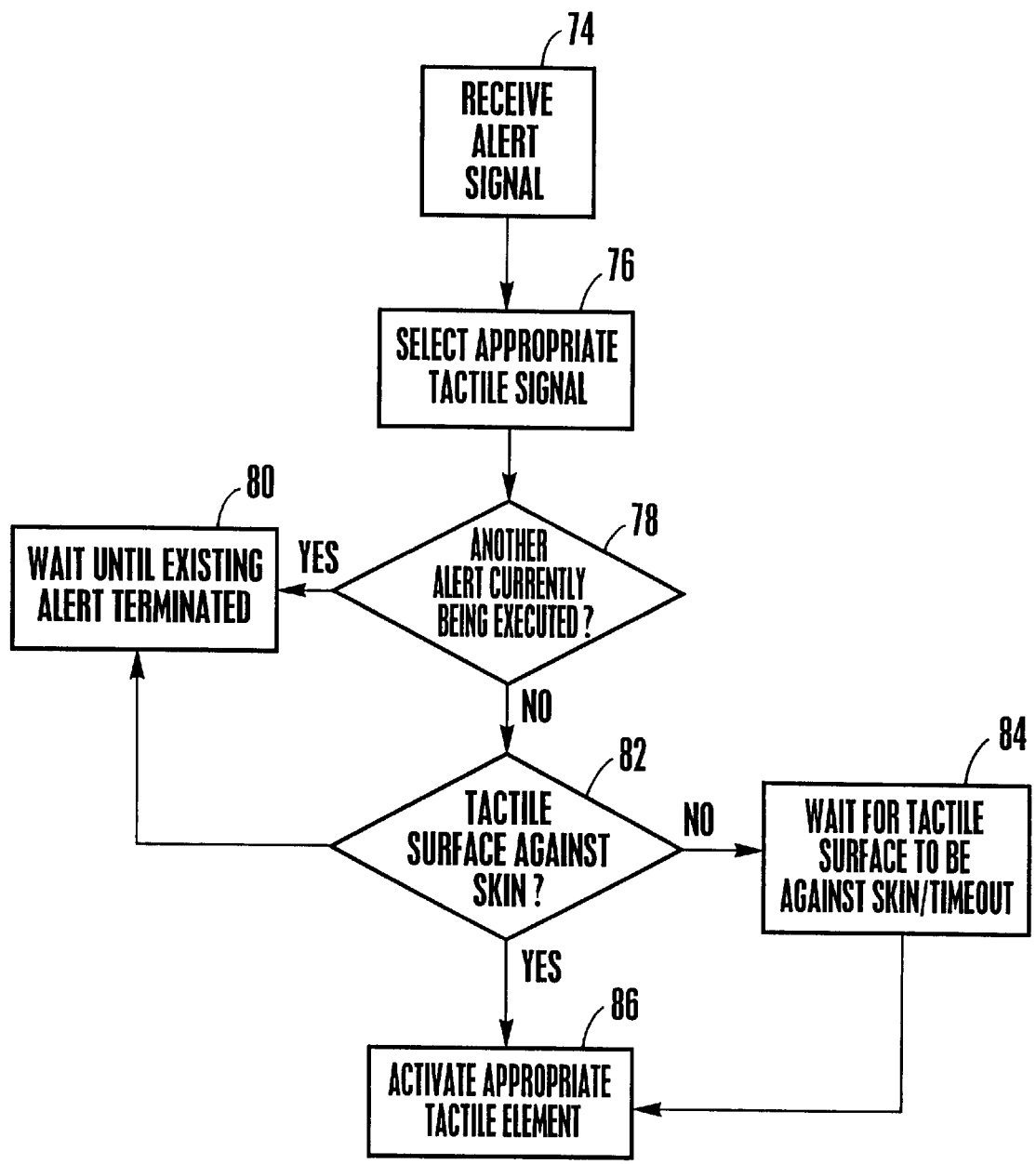
FIG. 7 is a flow chart showing the steps in generating tactile signals.

Now referring to FIG. 7, at block 74 an alert signal is received from a personal computing device 15. At block 76, the processor 30 selects the user-correlated tactile signal from the data store 32. Moving to decision diamond 78, the processor determines whether another tactile signal is currently being generated. If so, the process enters a wait loop at block 80 to wait until the currently generated tactile signal is complete.

From block 80, or from decision diamond 78 if no other tactile signal is currently being generated, the process moves to decision diamond 82 to determine, based on the signal from the pressure sensor 38 (FIG. 2), whether the tactile surface 50 of the tactile notification device 12 is in contact with a surface such as the person's skin. If the tactile surface 50 is not in contact, the process moves to block 84 to enter a wait loop to wait until the pressure sensor indicates that the tactile notification device 12 is properly positioned against the skin. From block 84, or from decision diamond 82 if the test there is positive, the logic moves to block 86 to activate the appropriate tactile element 36 to generate the appropriate tactile signal. The user can terminate the tactile signal by appropriately manipulating the signal-to-device correlator 40.

While the particular INTEGRATED TOUCH-SKIN NOTIFICATION SYSTEM FOR WEARABLE COMPUTING DEVICES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A system for centralizing notification of alerts of plural personal computing devices, comprising:

one and only one tactile notification device wearable by a person, the tactile notification defining a tactile surface facing the person when the device is worn by the person such that the tactile notification device generates one or more tactile signals when activated;

plural personal computing devices bearable by the person; and a wireless communication network establishing communication between the personal computing devices and the tactile notification device, wherein the devices are simultaneously worn by the person and the tactile notification device includes a wireless communication receiver, and the personal computing devices transmit respective alert signals to the receiver to activate the tactile notification device.

2. The system of claim 1, wherein the tactile notification device generates plural tactile signals, each tactile signal being different from other tactile signals generated by the tactile notification device, each tactile signal being correlated to a respective alert signal from a respective one of the personal computing devices.

3. The system of claim 2, wherein a user can correlate the tactile signals to the respective alert signals.

4. The system of claim 3, wherein the tactile notification device includes a data store to receive user signals indicating a user-defined correlation of the tactile signals to the respective alert signals.

5. The system of claim 1, wherein the tactile notification device includes one or more tactile elements engaged with the tactile surface.

6. The system of claim 5, wherein the tactile elements include parallel bars spaced from each other, at least one bar being disposed on the tactile surface and reciprocatingly movable toward and away from the other bar.

7. The system of claim 5, wherein the tactile elements include at least one bar rotatingly engaged with the tactile surface.

8. The system of claim 1, wherein the tactile notification device further comprises a pressure sensor for generating a contact signal when the tactile surface contacts another surface, such as the skin of a person.

9. A tactile notification device, comprising:
   a housing;
   one or more tactile elements on the housing; and
   a processor in the housing for activating the one or more tactile elements to generate plural tactile signals, at least some tactile signals corresponding to respective alerts from respective personal computing devices in wireless communication with the tactile notification device such that the personal computing devices can be simultaneously worn by a person with alerts from each activating the tactile elements such that only a single tactile notification device is needed to generate alerts from plural personal computing devices.

10. The tactile notification device of claim 9, wherein the tactile notification device is wearable by a person, the tactile notification defining a tactile surface facing the person when the device is worn by the person.

11. The tactile notification device of claim 10, further comprising a wireless communication receiver in wireless communication with the personal computing devices such that the personal computing device can transmit respective alert signals to the receiver to activate the tactile notification device.

12. The tactile notification device of claim 11, wherein the tactile notification device generates plural tactile signals, each tactile signal being different from other tactile signals generated by the tactile notification device, each tactile signal being correlated to a respective alert signal from a respective one of the personal computing devices.

13. The tactile notification device of claim 12, wherein a user can correlate the tactile signals to the respective alert signals.

14. The tactile notification device of claim 13, further comprising a data store to receive user signals indicating a user-defined correlation of the tactile signals to the respective alert signals.

15. The tactile notification device of claim 9, wherein the tactile elements include parallel bars spaced from each other, at least one bar being disposed on the housing and reciprocatingly movable toward and away from the other bar.

16. The tactile notification device of claim 9, wherein the tactile elements include at least one bar rotatingly engaged with the housing.

17. The tactile notification device of claim 1, further comprising a pressure sensor on the housing and generating a contact signal when the housing contacts a surface such as the skin of a person.

18. The tactile notification device of claim 9, in combination with the personal computing devices.

19. A method for signalling to a person when any of plural personal computing devices generates an alert signal, comprising:
   providing one and only one tactile notification device configured to generate plural tactile signals, at least two tactile signals being different from each other, each tactile signal corresponding to a respective personal computing device;
   supporting plural computing devices on a person;
   establishing wireless communication between the personal computing devices and the tactile notification device; and
   causing the tactile notification device to generate a tactile signal corresponding to an alerting personal computing device when the alerting personal computing device generates an alert signal.

20. The method of claim 19, further comprising storing user-defined correlations of tactile signals to personal computing devices in a data store.

21. The method of claim 20, further comprising generating a contact signal when the tactile notification device contacts a surface such as the skin of a person.

* * * * *